United States Patent [19]

Lee et al.

[11] Patent Number: 5,499,245

[45] Date of Patent: Mar. 12, 1996

[54] TEMPORAL PLACEMENT CONTROL OF VIDEO FRAMES IN B-ISDN NETWORKS

[75] Inventors: Duan-Shin Lee, Princeton Junction; Bhaskar Sengupta, Cranbury, both of N.J.

[73] Assignee: NEC USA, Inc., Princeton, N.J.

[21] Appl. No.: 332,978

[22] Filed: Nov. 1, 1994

[51] Int. Cl.⁶ .......................................................... H04J 3/16
[52] U.S. Cl. .......................... 370/94.2; 370/95.1; 348/385
[58] Field of Search .................................. 370/79, 82, 83, 370/17, 60, 60.1, 94, 94.2, 95.1, 118, 109, 110.1; 348/385, 387, 409

[56] References Cited

U.S. PATENT DOCUMENTS

| | | | |
|---|---|---|---|
| 4,677,616 | 6/1987 | Franklin | 370/79 |
| 5,124,978 | 1/1991 | Chao | 370/60 |
| 5,278,828 | 6/1992 | Chao | 370/94.1 |
| 5,379,297 | 1/1995 | Glover et al. | 370/94.2 |

Primary Examiner—Douglas W. Olms
Assistant Examiner—Seema S. Rao
Attorney, Agent, or Firm—Philip J. Feig

[57] ABSTRACT

Methods of traffic smoothing for frames of different video sources where each video source transmits frames at fixed intervals and the network is free to decide the relative temporal spacing of video frames from different sources provide significant performance advantages. The time at which a given source begins to transmit its first frame is under the control of the network; however, thereafter, all frames from the source are transmitted at fixed intervals. Two heuristic and one optimization method control the temporal placement of the video frames from different sources in order to reduce the loss rate of the high priority cells and to minimize the smoothness index of the traffic.

4 Claims, 6 Drawing Sheets

TEMPORAL PLACEMENT CONTROL OF VIDEO FRAMES IN B-ISDN NETWORKS

FIELD OF THE INVENTION

The present invention relates to methods of traffic smoothing for frames of different video sources in Broadband Integrated Services Digital Networks.

BACKGROUND OF THE INVENTION

A recurring problem in traffic studies of Broadband Integrated Services Digital Networks (B-ISDN) is the finding of methods by which traffic can be smoothed so that the network does not have to concern itself with extreme variations in bit-rates. Heretofore, this problem was addressed by means of flow control (using a leaky bucket and its variants) and congestion control (e.g. distributed source control, stop and go queuing, feedback control methods and dynamic window methods).

The present invention addresses a problem similar in nature to flow control but which is very different in terms of its objectives and scope.

SUMMARY OF THE INVENTION

In order to better understand the present invention, consider a statistical multiplexer at a network ingress which is receiving traffic from various video sources. Assume that there are K types of video calls. Type k calls arrive according to a Poisson process at a rate $\lambda_k$ and their call durations have a general distribution with mean $1/\mu_k$. Each call, while in progress, generates a frame every $\tau$ ms ($\tau$ is 33 in most applications). The number of Mbits in a frame is modelled by using the video sources studied by Verbiest and Pinnoo in an article "A Variable Rate Video CODEC for Asynchronous Transfer Mode Networks", in IEEE Journal on Selected Areas in Communications, 7(5), PP 761-770, Jun. 1989. Assume that the output channel rate of the multiplexer is C (e.g., C=150 Mbps) and that the input channel rate for call type k is $R_k$ (e.g., $R_k$=150 Mbps). When a source of type k transmits, it transmits a full frame as a burst at rate $R_k$, without any gaps. Thus if a particular frame has X Mbits, the source of type k transmits for $X \times 10^3/R_k$ ms and then remains silent for $\tau - X \times 10^3/R_k$ ms. Assume that the stationary distribution of $X_k$ (the frame size) for type k calls is given by $G_k(x)$, whose mean is $g_k$ (in Mbits). This implies that the mean bit-rate of a type k call is $g_k \times 10^3/\tau$ Mbps. The multiplexer adopts the following admission control strategy. When a new video call arrives, the mean bit-rate of all currently active calls is added with the new call. The new call is admitted if this sum is less than or equal to $\sigma$ times C (the output channel capacity of the multiplexer), otherwise it is not admitted. Now assume that marks are placed on the time axis at $0, \tau, 2\tau, \ldots$ ms and with each source j is an offset $O_j (0 < O_j < \tau)$. This means that the frames corresponding to source j begin to arrive at the multiplexer at times $O_j, \tau+O_j, 2\tau+O_j, \ldots$ Let $k_j$ denote the type of call for source j. If the ith frame from source j is of size $X_{kj}(i)$ (in Mbits), then the ith frame from source j is received at the multiplexer over the interval $[(i-1)\tau+O_j, (i-1)\tau+O_j+X_{kj}(i)\times 10^3/R_{kj}]$. If no control is exercised on the video sources, then $O_j$ is assumed to be uniformly distributed between O and $\tau$. If this happens, then it is possible that the start times of the frames belonging to the currently active sources are temporally very close to one another, which may result in high input rate for some time (and consequently, lead to lost packets) and poor performance. To alleviate this situation, a mechanism is needed which prevents the frames from different sources from being transmitted at or about the same time (i.e., prevent the frames from bunching). That is, the start time of the frames from different sources should be evenly spread out over the interval of $\tau$ ms. If this could be achieved, it should be possible to achieve less packet loss and better performance. Assume that this control is effected by the network by picking any value of $O_j$ it chooses. This choice is exercised only once per call, at the time of call admission. Once this number is determined for a particular call, it cannot be changed at a later time for the entire call duration (otherwise it may lead to synchronization problems at the destination). The problem is to find optimal methods of determining the value $O_j$ for a newly arrived call, given that the offsets of the currently active calls are known. The present invention provides solutions to the problem.

A principal object of the present invention is therefore, the provision of a method of temporal placement control of video frames in a B-ISDN network.

An object of the present invention is the provision of a midpoint method of temporal placement control of video frames.

A further object of the present invention is the provision of a smaller interval method of temporal placement control of video frames.

Another object of the present invention is the provision of an optimization method of temporal placement control of video frames.

A still further object of the present invention is the provision of a method of temporal placement control of video frames for reducing the loss rate of the high priority cells.

A still another object of the present invention is the provision of a method of interval placement control of video frames for minimizing the smoothness index of the traffic.

Further and still other objects of the present invention will become more clearly apparent when the following description is read in conjunction with the accompanying drawing.

DETAILED DESCRIPTION

Figure 1:
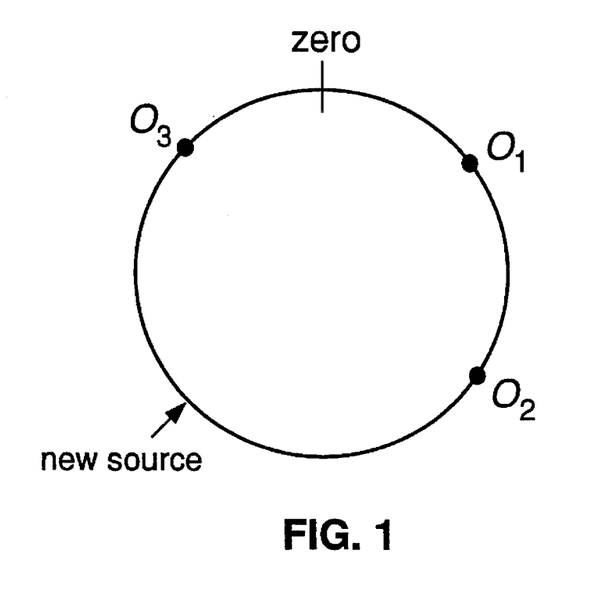
FIG. 1 is a graphical presentation of the midpoint method of practicing the present invention.

A first preferred method of practicing the present invention is referred to as the midpoint method. In accordance with the midpoint method, a circle is drawn having a circumference equal to the value $\tau$ (inter-frame interval). The offsets $O_j$ for the jth active call is drawn on the circumference of the circle. The 12 O'clock position is used for an offset of zero and the offsets are measured in the clockwise direction from the 12 O'clock position. Thus, any interval of the type $[(i-1)\tau, i\tau]$ along the time axis is represented by the circle, with the 12 O'clock point representing the point $i\tau$ for i=1, 2, ... For example, if there are n−1 active calls, the circumference of the circle is divided into n−1 intervals. If $O_1 \leq O_2 \leq \ldots \leq O_{n-1}$, then the intervals are $(O_j, O_{j+1})$ for j=1, ..., n13 2 and the last interval is from $O_{n-1}$ to $O_1$ in the clockwise direction. The largest interval is selected and the midpoint of the selected interval is chosen as the offset for the newly arrived call. The concept underlying the midpoint method is that as calls depart, they do so in a random manner. The randomness in departures could result in the remaining calls being bunched together. However, the midpoint method alleviates the bunching effect by choosing an offset which fills empty areas.

Figure 2:
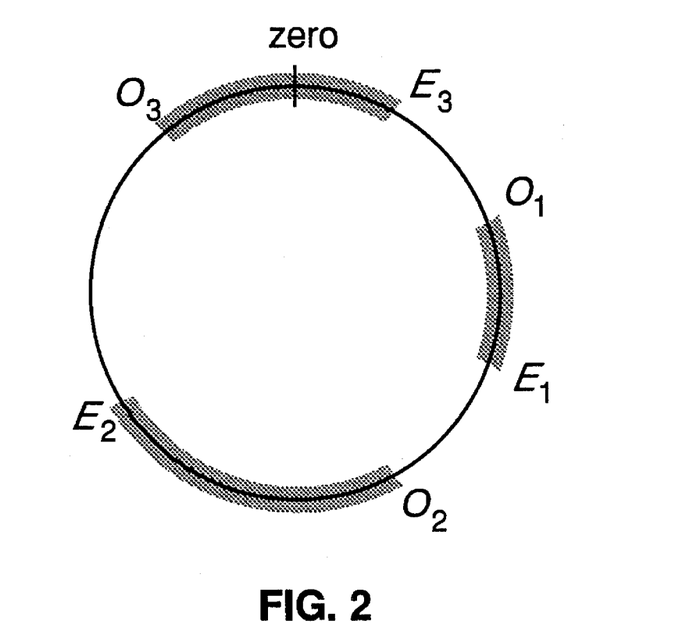
FIG. 2 is a graphical representation of the smallest interval method of practicing the present invention.

A second preferred method of practicing the present invention is referred to as the smallest interval method. In this method, a circle is drawn having a circumference $\tau$ as before. For each source, an interval is defined over which the source is expected to transmit. If there are n active sources and $k_j$ denotes the type of source j, then this interval for source j is defined as $[O_j, E_j]$, where $E_j = \{O_j + g_{k_j} \times 10^3 / R_{k_j}\}$, where $R_{k_j}$ is the access line speed. Here, the angle brackets ({ }) refer to modulo-$\tau$ arithmetic, so that all numbers remain between O and $\tau$. These n intervals are drawn on the circle and shaded as shown, for example, in FIG. 2. The shaded regions are areas with higher probability during which the currently active sources are transmitting. Therefore, the newly arrived source is made to transmit during the unshaded areas. The method requires defining an interval of length $g_{k_n} \times 10^3 / R_{k_n}$ for the nth call and then trying to locate the nth call in the smallest unshaded interval at least as large as the interval of the nth call. The locating is done so that $O_n = E_j$ for some j(j=1, ..., n−1). The result is that the shaded regions from two sources will be located end-to-end on the circle. Note that as calls depart, unshaded gaps on the circle will be created. It is possible that at some time, all of the unshaded intervals may be too small to locate the newly arrived call. In such event, the previously described midpoint method is used.

A third preferred method of practicing the present invention, based on an optimization problem, will now be described. Assume that n−1 calls are currently in progress whose call types ($k_j$) access line speeds ($R_{k_j}$) and offsets ($O_j$) are known (for j=1, ..., n−1). Assume further that call n is of type $k_n$ and has an offset $O_n$, which is to be determined. From the knowledge of the parameters, it is possible to determine the expected bit-rate at time t, for O<t<$\tau$. The expected bit rate is $P_n(t, O_1, \ldots, O_n)$. To clarify the meaning of $P_n(.)$ further, the value of $\int_0^x P_n(t,.)dt$ is the expected number of Mbits transmitted in the interval (O, x). The present optimization method attempts to choose a value of $O_n$ in such a manner that the function $P_n(.)$ has the greatest smoothness property. That is, $O_n$ is chosen to minimize $$\int_0^\tau P_n^2(t, O_1, \ldots, O_n)dt - \left\{ \int_0^\tau P_n(t, O_1, \ldots, O_n)dt \right\}^2. \quad (1)$$

Minimizing this function is likely to reduce the extreme variation in bit-rates. The following is a description of how this is accomplished. There are two parts in this description.

First, a method of solving the problems is discussed. Second, a method of speeding up the convergence of the computations is shown.

Let $G_{kj}(x)$ denote the distribution function of the number of Mbits generated in a frame by source j and let $\bar{G}_{kj}(x)$ denote its complementary function (i.e., $\bar{G}_{kj}(x) = 1 - G_{kj}(x)$). Consider a source j for $1 \leq j \leq n$. First, assume that the offset $O_j$ is zero. The expected number of Mbits that arrive during (t,t+dt) from source j can be obtained by the following argument. Assume that the number of Mbits generated by this source in a particular frame is x. If $x > R_{kj}t$, the number of Mbits that arrive in (t,t+dt) is $R_{kj}dt$. If $x \leq R_{kj}t$, the number of Mbits that arrive in (t,t+dt) is zero. Therefore, the expected bit-rate at time t for source j is given by $$h_j(t) = R_{kj}\bar{G}_{kj}(R_{kj}, t).$$

Note that $h_j(t)$ is only defined for $0 \leq t < \tau$. Define the periodic version of $h_j(t)$ by $\tilde{h}_j(t)$, i.e., $$\tilde{h}_j(t+k\tau) = h_j(t),$$

for k=0, 1, ... If the offset $O_j$ is not zero, the expected bit-rate at time t is given by $$f_j(t, O_j) = \tilde{h}_j(t - O_j).$$

From the definition of $P_n(t, O_1, O_2, \ldots, O_n)$, the result is $$P_n(t, O_1, O_2, \ldots, O_n) = \sum_{j=1}^n f_j(t, O_j) = \sum_{j=1}^n \tilde{h}_j(t - O_j). \quad (2)$$

Next, it is necessary to find the optimal $O_n$ that minimizes the variance of $P_n(t, O_1, O_2, \ldots, O_n)$, i.e., minimizes Eq.(1). But $$\int_0^\tau P_n(t, O_1, O_2, \ldots, O_n)dt$$

dt is the expected number of Mbits transmitted in (0, $\tau$)] and equals $$\sum_{j=1}^n g_{k_j} \times 10^3/\tau.$$

So the problem is equivalent to $$\min_{0 \leq O_n < \tau} \int_0^\tau P_n^2(t, O_1, O_2, \ldots, O_n)dt \quad (3)$$

To perform the minimization in Eq.(3), first assume that the number of Mbits generated by a video source of type k in a frame can be represented by a truncated and shifted second-degree Erlang random variable $X_k$. This is a rich two parameter family of distributions (the parameters are $\alpha_k$ and $S_k$) which should meet most modeling needs. The density function of this random variable is $$P(x < X_k \leq x + dx) = \quad (4)$$

$$\begin{cases} B\alpha_k^2(x - s_k)\exp(-\alpha_k(x - s_k))dx & \text{if } s_k \leq x < R_k\tau \\ 0 & \text{otherwise,} \end{cases}$$

where B is a suitable normalization constant which makes the density integrate to one. Since $\tau R_k$ (the number of Mbits that can be transmitted in time $\tau$) is much greater than the expected value of $X_k$, the normalization constant B is actually very close to one in Eq.(4). The numerical results below were obtained using values of K=1, 2. for source type 1, $\alpha_1$=9.411 (1/Mbits) and $S_1$=3.467 (Mbits) were chosen. With these choices, the mean and standard deviation of $X_1$ turn out to be 0.559 Mbits and 0.15 Mbits. This is a good approximation because Verbiest and Pinnoo supra report a mean and standard deviation of 0.56 and 0.143 Mbits respectively. It is further assumed that the type 2 sources are a scaled version of type 1 sources by a factor of 0.5, then $\alpha_2=\alpha_1/0.5$ and $S_2=0.5 S_1$. Note that this scaling preserves all other characteristics (such as autocorrelations) of the sources of type 1.

The complementary distribution of $X_k (k=1, \ldots, K)$ is $$G_k(x) = \begin{cases} B\exp(-\alpha_k(x-s_k))(\alpha_k(x-s_k)+1) & \text{if } s_k < x < \tau R_k \\ 1, & \text{if } 0 \leq x \leq s_k \end{cases} \quad (5)$$

Therefore, $$h_k(t) = R_k G_k(R_k t)$$

$$= \begin{cases} R_k, & \text{if } 0 \leq t < s/R_k \\ R_k B\exp(-\alpha_k(t-s_k))(\alpha_k(t-s_k)+1) & \text{if } s_k/R_k < t < \tau \end{cases}$$

The Fourier coefficients of $\tilde{h}_k(t)$ are now given by $$c_m(k) = \frac{1}{\tau} \int_0^\tau \tilde{h}_k(t) \exp\left(-\frac{2\pi m i t}{\tau}\right) dt$$

$$= \frac{R_k}{2\pi m i} \left(1 - \exp\left(\frac{2\pi m i s_k}{R_k \tau}\right)\right) +$$

$$\frac{2\exp\left(-\frac{2\pi m i s_k}{R_k \tau}\right)(\pi m i + \alpha_k R_k \tau) R_k B}{2\pi m i + \alpha_k R_k \tau)^2}$$

for $-\infty < m < \infty$, $k = 0, 1, \ldots, n$.

Note that a different assumption on $\tilde{G}_k(x)$ in Eq. (5) would cause a different result for $c_m(k)$. In all other respects, the methodology remains the same. Let $\{\phi_m\}$ denote the Fourier coefficients of $P_n(t, O_1, \ldots, O_n)$. Then, from Eq. (2), $$\phi_m = \sum_{j=1}^n c_m(k_j) \exp\left(-\frac{2\pi m i O_j}{\tau}\right)$$

Using Parseval's theorem, the result is $$\int_0^\tau P_n^2(t, O_1, \ldots, O_n) dt = \sum_{m=-\infty}^\infty |\phi_m|^2. \quad (6)$$

To carry out the minimization Eq. (3), allow L possible choices of $O_n$ on a grid, so that $O_n = \tau(l-1)/L$ for $l=1, \ldots, L$. Then choose that value of l which minimizes Eq. (6).

Now the second part will be addressed, i.e., the speed of convergence of the computations. Since $c_m(k)$ is of the order $m^{-1}$, Eq. (6) has the same rate of convergence as the series $\Sigma m^{-2}$. While this may be satisfactory in some applications, it is possible to speed up this rate of convergence further as described below. Define $$J_k = h_k(0+) - h_k(\tau-) \text{ for } k = 1, \ldots, K,$$

$$\xi(t+j\tau) = t, \quad 0 \leq t < \tau, j = 0, 1, \ldots, n$$

and $$P^*_n(t, O_1, \ldots, O_n) = P_n(t, O_1, \ldots, O_n) + \sum_{j=1}^n \frac{J_{k_j}}{\tau} \xi(t-O_j). \quad (7)$$

Note that $P_n(t, O_1, \ldots, O_n)$ has n discontinuities at $t=O_1,$ . . . , $O_n$, while $P^*_n(t, O_1, \ldots, O_n)$ is continuous. Let $\{d_m\}$ denote the Fourier coefficients of $$\sum_{j=1}^n \frac{J_{k_j}}{\tau} \xi(t-O_j).$$

Then $$d_m = \begin{cases} \sum_{j=1}^n \frac{J_{k_j}}{2}, & \text{if } j = 0 \\ \sum_{j=1}^n \frac{-J_{k_j}}{2\pi m i} \exp\left(-\frac{2\pi m i O_j}{\tau}\right), & \text{if } j \neq 0. \end{cases} \quad (8)$$

Let $\{\phi^*_m\}$ denote the Fourier coefficients of $P^*_n(t, O_1, \ldots, O_n)$. From Eq. (7), $$|\phi_m|^2 = |\phi^*_m - d_m|^2 = |\phi^*_m|^2 + |d_m|^2 - 2\text{Re}(\phi_m \bar{d}_m), \quad (9)$$

where $\bar{d}_m$ is the complex conjugate of $d_m$. Substitute Eq. (9) in Eq. (6) to get $$\sum_{m=-\infty}^\infty |\phi_m|^2 = \sum_{\substack{m=-\infty \\ m \neq 0}}^\infty |\phi^*_m|^2 + \sum_{\substack{m=-\infty \\ m \neq 0}}^\infty |d_m|^2 - \quad (10)$$

$$2 \sum_{\substack{m=-\infty \\ m \neq 0}}^\infty \text{Re}(\phi^*_m \bar{d}_m) + |\phi^*_0 - d_0|^2,$$

The second term on the right hand side of Eq. (10) can be simplified as follows:

$$|d_m|^2 = \frac{1}{4\pi^2 m^2} \left[ \left(\sum_{j=1}^n J_{k_j} \cos \frac{2\pi m O_j}{\tau}\right)^2 + \left(\sum_{j=1}^n J_{k_j} \sin \frac{2\pi m O_j}{\tau}\right)^2 \right] =$$

$$\frac{1}{4\pi^2 m^2} \left[ \sum_{j=1}^n J_{k_j}^2 + \sum_{l=1}^n \sum_{\substack{j=1 \\ j \neq l}}^n J_{k_l} J_{k_j} \cos \frac{2\pi m |O_l - O_j|}{\tau} \right].$$

Let $B_2(x) = x^2 - X + 6^{-1}$ denote the Bernoulli polynomial of second degree and let $\tilde{B}_2(x)$ be the periodic version of $B_2(x)$, i.e., $\tilde{B}_2(x+m\tau) = B_2(x)$ for $m=0,1, \ldots$ and $0 \leq x < \tau$. From the well known identities $$\tilde{B}_2(x) = \sum_{m=1}^\infty \frac{\cos 2\pi m x}{\pi^2 m^2} \text{ and } \sum_{m=1}^\infty \frac{1}{m^2} = \pi^2/6,$$

Eq. (10) becomes $$\sum_{m=-\infty}^\infty |\phi_m|^2 = |\phi^*_0 - d_0|^2 + \sum_{j=1}^n \frac{J_{k_j}^2}{12} + \quad (11)$$

$$\sum_{l=1}^n \sum_{\substack{j=1 \\ j \neq l}}^n \frac{J_{k_l} J_{k_j}}{2} B_2\left(\frac{|O_l - O_j|}{\tau}\right) +$$

$$2 \sum_{m=1}^\infty |\phi^*_m|^2 - 4 \sum_{m=1}^\infty \text{Re}(\phi^*_m \bar{d}_m).$$

Since the derivative of $P^*_n(t, O_1, \ldots, O_n)$ with respect to t has bounded variation, $\phi^*_m$ is of order $m^{-2}$. Hence, Eq. (11) has the same convergence rate as the series $\Sigma m^{-3}$ which is much better than that of Eq. (6). It is possible to speed up the convergence rate even more by adding a quadratic (or higher order) term to Eq. (7), which guarantees the existence of the second (or higher order) derivative of $P_n(t, O_1, \ldots, O_n)$ with respect to t. However, this is possible at the cost of considerable extra effort. Moreover, very satisfactory results were obtained with the method presented above. This completes the description of the speed of convergence of the computations.

Having described the theoretical basis for the three preferred methods of practicing the invention, the effects of applying these methods by simulation will now be described. A fluid-flow model as described in the article by D.S. Lee, et al entitled, "TES Modeling for Analysis of a Video Multiplexer, in Performance Evaluation, Vol 16,. PP 21–34, 1992, is used in order to keep the run time for the simulations within reasonable limits. The number of Mbits in a frame ($X_k$) is modelled by using the sum of two autoregressive processes and a Markov chain. This model matches the bit-rate histogram and the autocorrelation function for video sources studied by Verbiest and Pinnoo supra. The mean bit-rate of these sources is 16.8 Mbps (which corresponds to 0.56 Mbits per frame). If K=2, then two types of sources are considered. One type of source which is high bit-rate and the other type of source whose bit-rate is scaled by a factor of 0.5 (i.e., half the bit-rate, but otherwise preserving all other characteristics of the sources). The sources arrive according to a Poisson process and may or may not be admitted to the multiplexer according to the admission control strategy described above. Thus, the number of active sources in the simulation changes with time. The call holding time is assumed to be distributed uniformly between 5400 and 9000 frames. It is assumed that a layered coding scheme has been employed and therefore, the primary interest is in the loss rate of the high priority cells. The buffer threshold to discard low priority cells is 50 (in cells) and the total buffer size of the multiplexer is 300 cells. In order to faithfully compare the three methods, four systems (three control policies and the system without control) are simulated subject to the same arrival processes and holding times of video sources. Specifically one sequence of call arrivals and holding times is generated and fed to all four systems. This means that all four systems receive the same number of Mbits per frame from all accepted calls. In all the results, C=150 Mbps, $R_k$=150 Mbps for k=1, 2, σ=0.95 and L=33.

Figure 3:
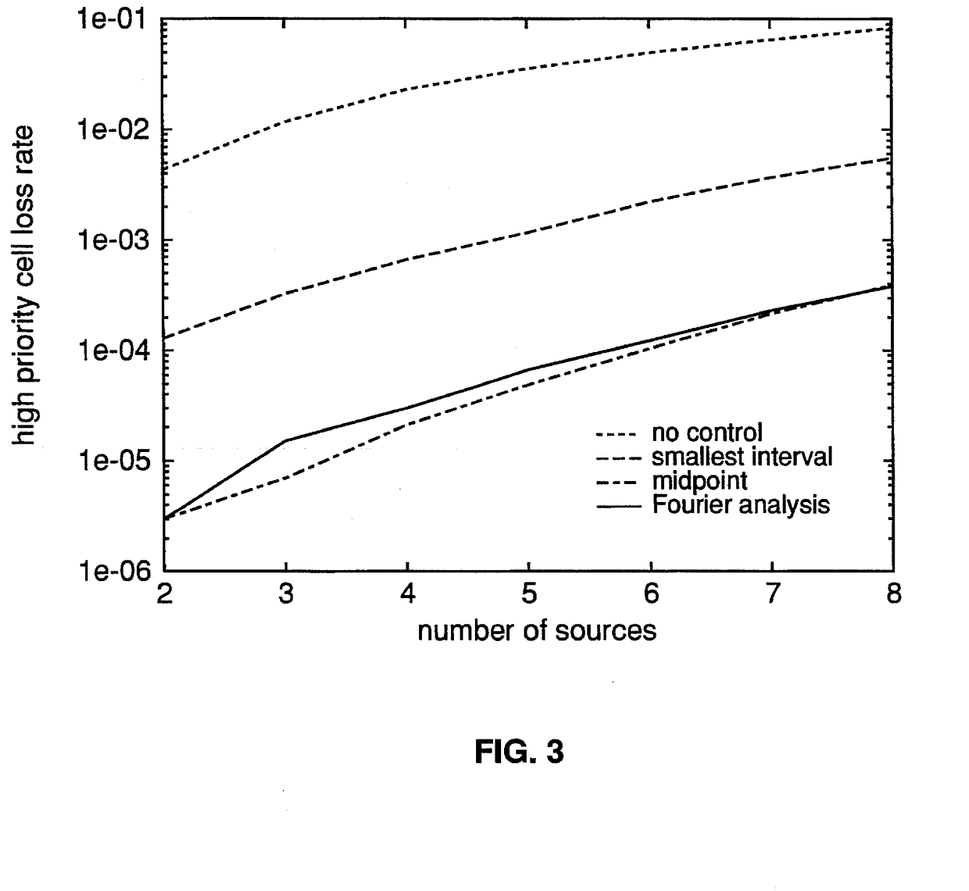
FIG. 3 is a graphical representation of high priority cell loss rate when practicing the present invention in the case of homogeneous video sources.

In the first set of comparisons (see FIG. 3), it was assumed that K=1, i.e., the sources are homogeneous. The sources arrive according to a Poisson process of rate 0.03 (1/sec). The loss rate of the high priority cells is computed conditioned on the fact that n sources are active. This conditional loss probability is plotted against n in FIG. 3. FIG. 3 shows that both the Fourier analysis method and the midpoint method outperform the smallest interval method. Further, all three are much better than having no control at all. It is not difficult to understand the qualitative aspect of this result. The smallest interval method places the shaded arcs end-to-end on the circle. This means that severe bunching of the offsets is avoided, i.e., the offsets are not too close to each other. However, if there are only two or three sources which have just started transmission, then their shaded regions will lie close to one another in one part of the circle. This is to be contrasted with the midpoint method, in which if two or three sources have just started transmission, their offsets will be very far apart from each other. This explains why the latter method is better than no control and why the midpoint method is so much better than the smallest interval method. The Fourier analysis method in this case performs about the same as the midpoint method. The reason why the two graphs do not coincide is that the criterion of optimality (greatest smoothness in expected bit-rate) is different from the criterion of loss rate (which is what is shown in FIG. 3). Moreover, the fact that the Fourier analysis method chooses a point on a discrete grid makes it non-optimal.

Figure 4:
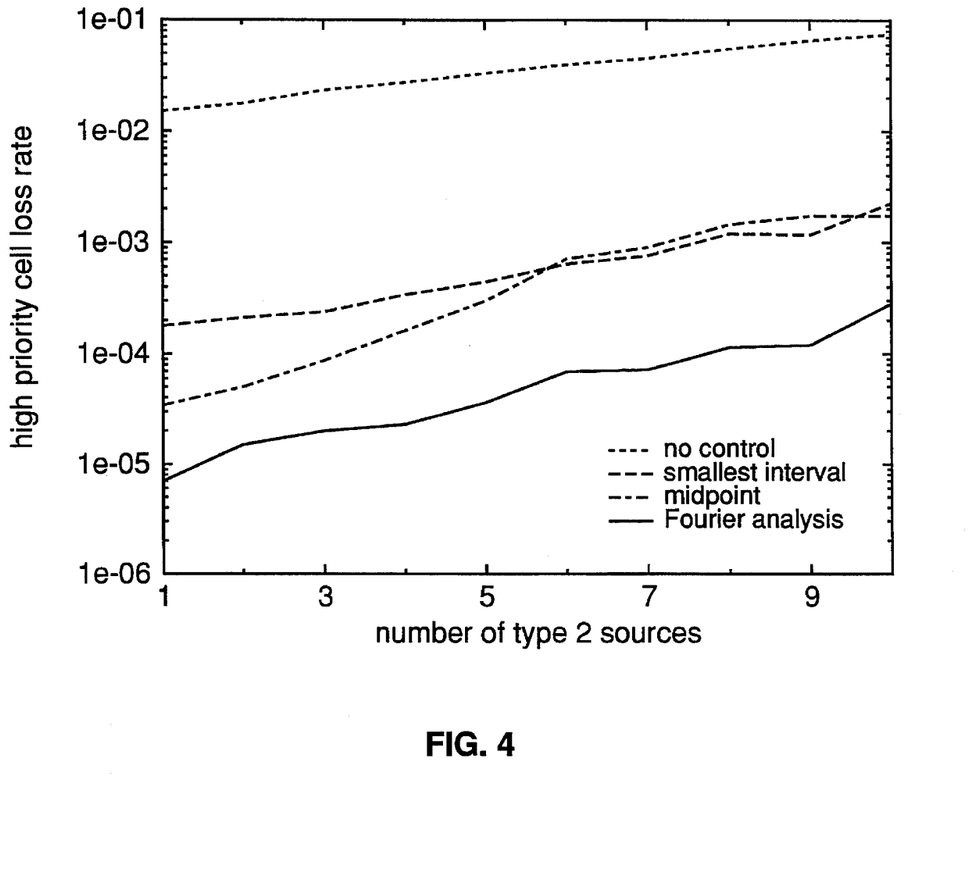
FIG. 4 is a graphical representation of high priority cell loss rate when practicing the present invention in the case of heterogeneous video sources and three type 1 sources.
Figure 5:
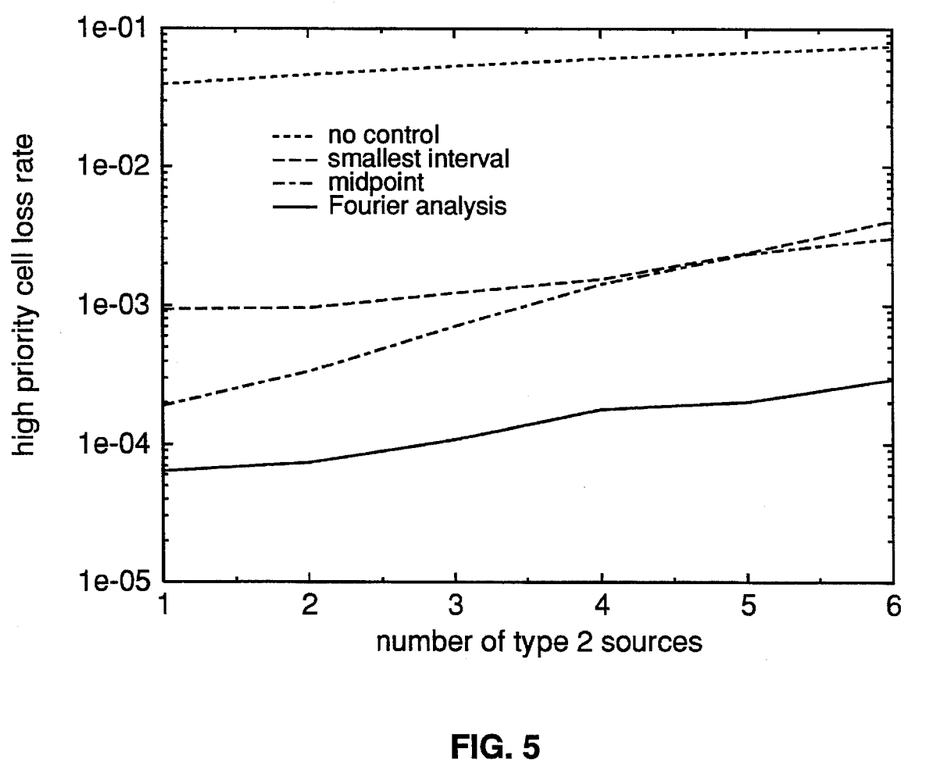
FIG. 5 is a graphical representation of high priority cell loss rate when practicing the present invention in the case of heterogeneous video sources and five type 1 sources.
Figure 6:
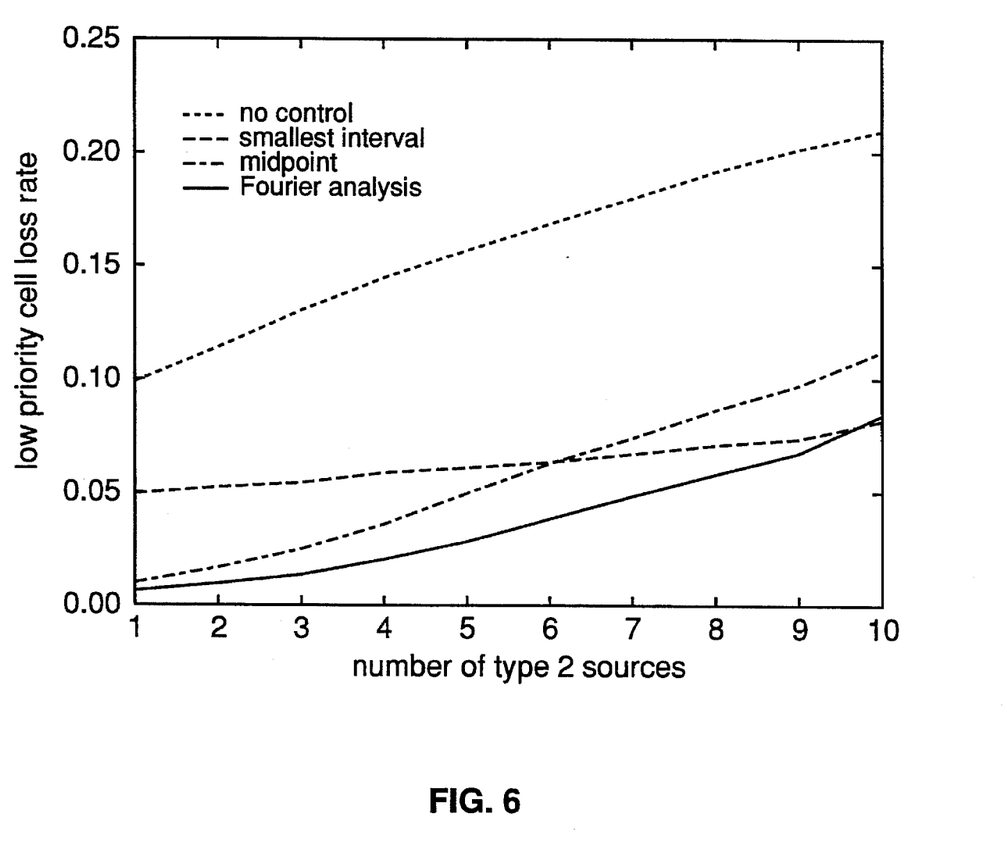
FIG. 6 is a graphical representation of low priority cell loss rate when practicing the present invention in the case of heterogeneous video sources and three type 1 sources.
Figure 7:
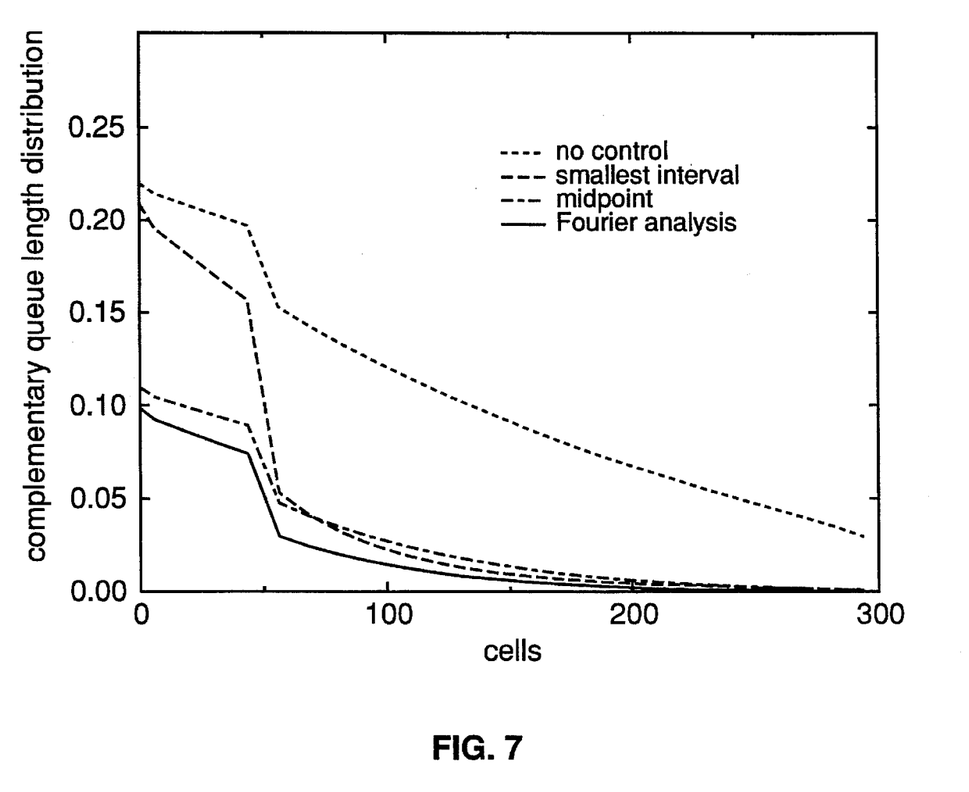
FIG. 7 is a graphical representation of the complementary distribution of queue length when practicing the present invention in the case of heterogeneous video sources.

For the case when K=2, which is referred to as the heterogeneous case, the results are shown in FIGS. 4 and 5. The sources of both types arrive according to Poisson processes of rate 0.015 (1/sec). Again, the results are obtained by a single simulation run in which the loss rate of high priority cells of both types of calls conditioned on $n_1$ type 1 calls and $n_2$ type 2 calls being active. Then, FIG. 4 is plotted with $n_1$=3 with $n_2$ as the x-axis and FIG. 5 is the corresponding graph with $n_1$=5. In both of these graphs, it is obvious that having any control method is far better than having no control. But this time, note that the Fourier analysis method far outperforms the other two heuristic methods. This is intuitive, since the two heuristics were not designed specifically for heterogeneous traffic. Imagine that $n_1$=$n_2$=1. The midpoint method would try to place one offset at 0 and the other at τ/2 without taking into consideration the fact that the two sources are very different in size. The Fourier analysis method, being analytical, takes into account these factors automatically. It places the offset of the type 1 source at 0 and that of the type 2 source at about 2τ/3, since a type 1 source has twice the bit-rate of a type 2 source. Also observe that when $n_2$ becomes large, the two heuristics perform about equally well. This is also to be expected. When the circle is more filled with shaded regions, two things happen. Either the shortest interval method reverts to the midpoint method or the shaded arcs lie reasonably close to one another with a small amount of gap. In either case, its behavior is not expected to be too different from that of the midpoint method. The low priority cell loss rate is shown in FIG. 6 for $n_1$=3. The complementary distribution of queue length (unconditional) during the entire simulation is shown in FIG. 7. Again the Fourier analysis method provides the best performance for the low priority cell loss rate and the queue length distribution.

In addition to the loss probability, another measure was used to compare the three methods. This measure is the smoothness index (η), which is the square root of the quantity in Eq. (1). The square root of the quantity in Eq. (1) is used because it has the more natural units of Mbits. The computation of the smoothness index was done by two simulation runs, one for the homogeneous case and the other for the heterogeneous case. For the homogeneous and the heterogeneous cases, the (unconditional) value of the smoothness index is shown in Table 1 for the problem in which no control is exercised as well as the three control methods. As expected, the smoothness index is lowest for the Fourier analysis method, followed very closely by the midpoint method. The difference between these two and the smallest interval method as well as the no control case is more. Even by this criterion, the Fourier analysis method and midpoint methods give much better results. Note that the difference between the Fourier analysis method and the midpoint method is quite small. This is to be contrasted with the conditional loss probabilities reported for the heterogeneous case, in which the difference between these two methods was much higher. The reason this difference occurs is because of the bursty traffic. It is possible to have a difference in measures such as loss probabilities while more robust measures like mean and variance of queue length show very little difference. The smoothness measure is (in some sense) measuring the variation in the input rate. While this measure correctly preserves the relative ranking of the different control methods, it does not give the complete picture about loss probabilities.

TABLE 1

Smoothness index (in the unit of Mbuts) for the homogeneous case and the heterogeneous case.

|  | no control | smallest interval | midpoint | Fourier analysis |
|---|---|---|---|---|
| homogeneous | 26.2 | 22.3 | 21.4 | 21.5 |
| heterogeneous | 23.5 | 20.3 | 19.9 | 19.5 |

In summary, three methods for temporal placement control of video frames have been described. The results show that any reasonable form of control is much better than having no control. Of the three methods, the midpoint method is very simple and performs generally as well as the Fourier analysis method for homogeneous sources. However, for heterogeneous sources, the Fourier analysis method provides the best results.

While there has been described and illustrated several methods of temporal placement control of video frames on B-ISDN networks, it will be apparent to those skilled in the art that variations and modifications are possible without deviating from the broad principle and spirit of the present invention which shall be limited solely by the scope of the claims appended hereto.

What is claimed is:

1. A method of temporal placement control of video frames in B-ISDN networks comprising the steps of:

dividing the inter-frame interval ($\tau$) into a quantity of intervals equal to the quantity of active calls, and selecting the largest interval of said quantity of intervals and the midpoint of said selected largest interval is the offset for a newly arriving call.

2. A method of temporal placement control of video frames in B-ISDN networks comprising the steps of:

dividing the inter-frame interval ($\tau$) into intervals during which a source is expected to transmit such that for n active sources, $k_j$ denotes the type of source j, and the interval for source j is defined as, where $E_j = <O_j + g_{k_j} \times 10^{3}/R_{k_j}>$ where $R_{k_j}$ is the access line speed, $E_j$ is the interval for source j, $O_j$ is the offset for the jth active call, and $g_{k_j}$ is the interval length for the jth call, and selecting the smallest portion of the inter-frame interval ($\tau$) greater than the length of a newly arriving call not within the interval for the source of said newly arriving call for the offset of said newly arriving call.

3. A method of temporal placement control of video frames as set forth in claim 2 where when any said portion of the inter-frame interval, not including any said interval, is smaller than the length of said newly arriving call, the following steps are performed:

dividing the inter-frame interval into a quantity of intervals equal to the quantity of active calls, and selecting the largest interval of said quantity of intervals and the midpoint of said selected largest interval is the offset for said newly arriving call.

4. A method of temporal placement control of video frames is B-ISDN networks where there are n-1 calls in progress whose call types ($k_j$) access line speeds ($R_{k_j}$) and offsets ($O_j$) are known (for j=1, . . . , n-1) comprising the steps of:

for an additional call n of type $k_n$, having an expected bit-rate $P_n(\cdot)$ at time t, for $0<t<\tau$, selecting the offset $O_n$ of the additional call such that $$\int_0^\tau P^2_n(t, O_1, \ldots, O_n)dt - \left\{ \int_0^\tau P_n(t, O_1, \ldots, O_n)dt \right\}^2$$

where $\tau$ is the inter-frame interval, is minimized.

* * * * *